United States Patent Office 3,532,721
Patented Oct. 6, 1970

3,532,721
CYCLOPENTYL-ALKANOIC ACIDS
Neville Finch, West Orange, N.J., assignor to Ciba Corporation, Summit, N.J., a corporation of Delaware
No Drawing. Continuation-in-part of application Ser. No. 640,374, May 22, 1967. This application Feb. 12, 1968, Ser. No. 704,533
Int. Cl. C07d 7/04
U.S. Cl. 260—345.8      3 Claims

ABSTRACT OF THE DISCLOSURE

The hydrolysis of oximes having the formula

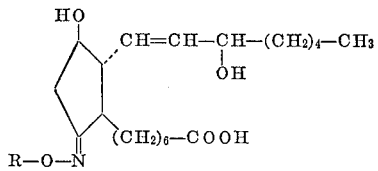

R=H, alkyl, alkenyl, cycloalkyl, haloalkyl or aralkyl the esters and/or salts thereof, yields the corresponding hypotensive ketone, i.e. prostaglandin $E_1$.

This application is a continuation-in-part of my copending application Ser. No. 640,374, filed May 22, 1967.

SUMMARY OF THE INVENTION

The present invention concerns and has for its object the provision of the ω-[2α-(3-hydroxy-1-octenyl)-3β-hydroxy-5-oxo-cyclopentyl]-heptanoic acid of the Formula I

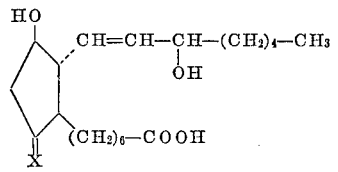

(I)

wherein X stands for oxo, its esters and/or salts, by cleavage of the corresponding oximes of Formula I in which X stands for an unsubstituted or alphatically substiuted hydroxyimino group, methods for their preparation as well as new intermediates. The optically active acid of Formula I, in which X stands for oxo, is the known prostaglandin $E_1$ or $PGE_1$, which is a potent hypotensive agent in mammals.

DESCRIPTION OF THE PREFERRED EMBODIMENTS

The O-substituents of the above hydroxyimino group X are, for example, lower alkyl, such as methyl, ethyl, n- or i-propyl, -butyl, -pentyl, -hexyl or -heptyl; lower alkenyl, such as allyl or methallyl; cycloalkyl or cycloalkyl-lower alkyl containing preferably 3 to 6 ring- and 1 to 4 chain-carbon atoms, such as cyclopropyl, cyclopentyl, cyclohexyl, cyclopropylmethyl, cyclopentylmethyl, cyclohexylemethyl, 1- or 2-cyclopentylethyl or 1'-, 2- or 3-cyclohexylpropyl. These aliphatic radicals may be substituted, for example, by esterified hydroxy groups, preferably one or more than one halogen atom, such as chloro or bromo, being separated from the oxygen atom of the oxime group by at least 2 carbon atoms, and/or an aromatic radical, preferably phenyl or phenyl substituted by one or more than one of the same or different substituents, such as lower alkyl, e.g. methyl, ethyl, n- or i-propyl or -butyl, lower alkoxy, e.g. methoxy, ethoxy, n- or i-propoxy or -butoxy, lower alkylenedioxy, e.g. methylenedioxy, 1,1- or 1,2-ethylenedioxy, halogeno, e.g. fluoro, chloro, bromo or iodo, trifluoromethyl, nitro or amino, such as di-lower alkylamino, e.g. dimethylamino or diethylamino. Preferred substituted aliphatic radicals are 2-chloro- or bromo-ethyl, -propyl or -butyl, 2,2-dichloro-ethyl, -propyl or -butyl, 3,3,3-trichloroethyl, 3-chlro- or bromopropyl or -butyl, 4-chloro- or bromo-butyl, R-methyl, 1- or 2-R-ethyl, in which R stands for phenyl, (lower alkyl)-phenyl, (lower alkoxy)-phenyl, (lower alkylenedioxy)-phenyl, (halogeno)-phenyl, (trifluoromethyl)-phenyl, (nitro)-phenyl or (di-lower alkylamino)-phenyl.

The esters of the acids of Formula I in which X stands for oxo or said hydroxyimino group, more particularly are those of alcohols, preferably aliphatic or araliphatic alcohols, such as those containing the above-described aliphatic or araliphatic radicals bound at the carboxyl group. Salts of said acids are, more particularly, those of alkali or alkaline earth metals, e.g. sodium potassium, magnesium or calcium, or ammonium salts derived from ammonia or amines, preferably aliphatic amines, such as mono-, di- or tri-lower alkylamines, e.g. methylamine, ethylamine, diethylamine or triethylamine, or heterocyclic bases, e.g. pyrrole, pyrrolidine, pyridine, lutidine, piperidine, piperazine and the like, or therapeutically useful bases, such as 2-heptamethylene-ethylguanidine, 1-hydrazino- or 1,4-dihydrazino-phthalazine, 3-methylamino - isocamphane, N-methyl-N-2-propylnyl - benezylamine, glucosamine, glutamine, galactamine, epinephrine, norepinephrine, ephedrine, phenylephrine, procaine and the like.

Particularly useful starting materials in the process of the invention are those of Formula I, wherein X stands for hydroxyimino, lower alkoxyimino, 2-mono-, di- or trihalogeno-lower alkoxyimino, and the lower alkylesters of these compounds.

Especially valuable are the compounds of Formula I, in which X stands for hydroxyimino, methoxyimino and 2-bromoethoxyimino.

The cleavage of said oximes, according to the present invention, is advantageously carried out by hydrolysis in the presence or absence of a hydroxylamine acceptor, preferbaly under mild conditions. In said hydrolysis advantageously aqueous acids are used, for example, mineral acids or strong organic acids, such as hydrohalic acids, sulfuric or perchloric acid; carboxylic or sulfonic acids, such as trifluoroacetic or p-toluene sulfonic acid. Hydroxylamine acceptors are preferably oxo-compounds, which at the same time also may serve as hydrolytic agent (for example, ketoacids) e.g. formaldehyde, acetone or levulinic acid; or nitrous acid and the like.

The cleavage of the oximes can also be carried out stepwise. For example, the 2-bromo-alkoxyimino compounds can be converted into the O-unsubstituted oximes by reductive cleavage, advantageously with the use of metals, such as magnesium or preferably zinc, or reductive metal salts, such as chromium II acetate, whereby unsaturated aliphatic or araliphatic hydrocarbons are generated. The resulting O-unsubstituted oximes can easily be cleaved under mild conditions, for example with the use of aqueous carboxylic acids, such as acetic acid, advantageously in the presence of nitrous acid.

The starting material used in the present process, as well as the intermediates in its synthesis, i.e. the compounds of the Formulae I (X=a hydroxyimino group) and III to XII shown below, are new and are intended to be included within the scope of the present invention. They can be prepared according to the following formulae scheme:

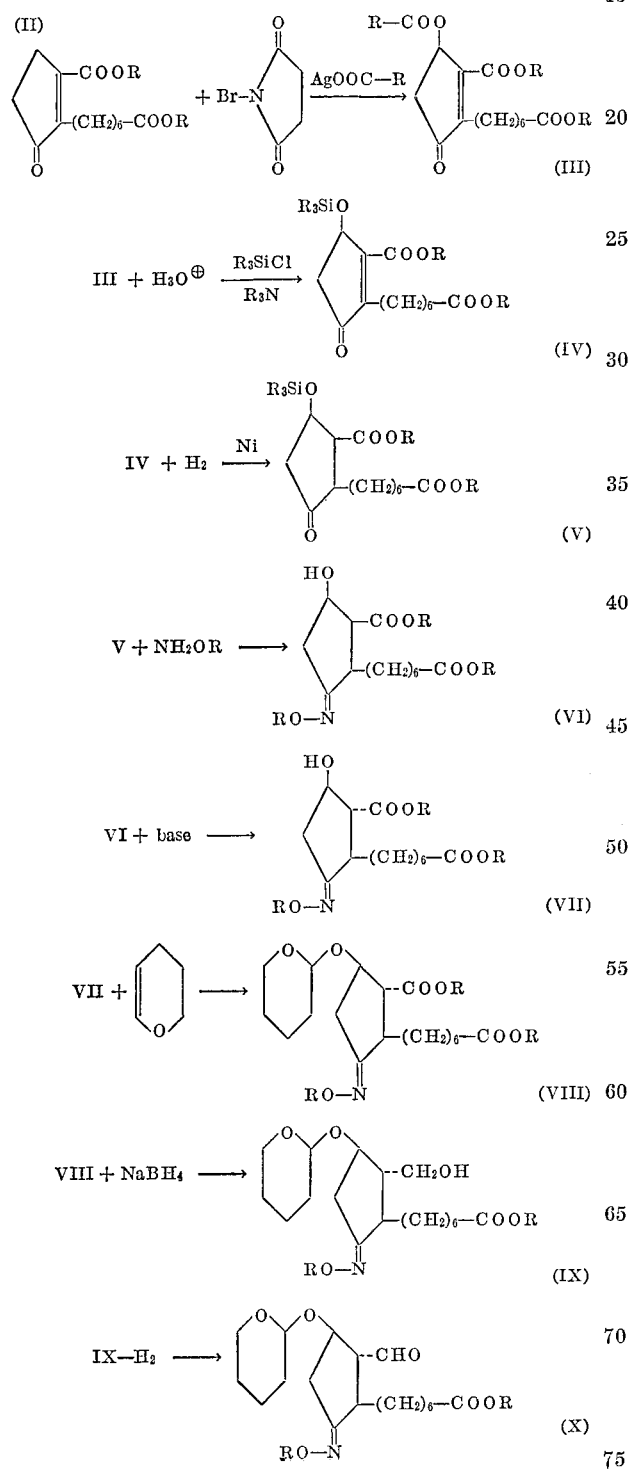

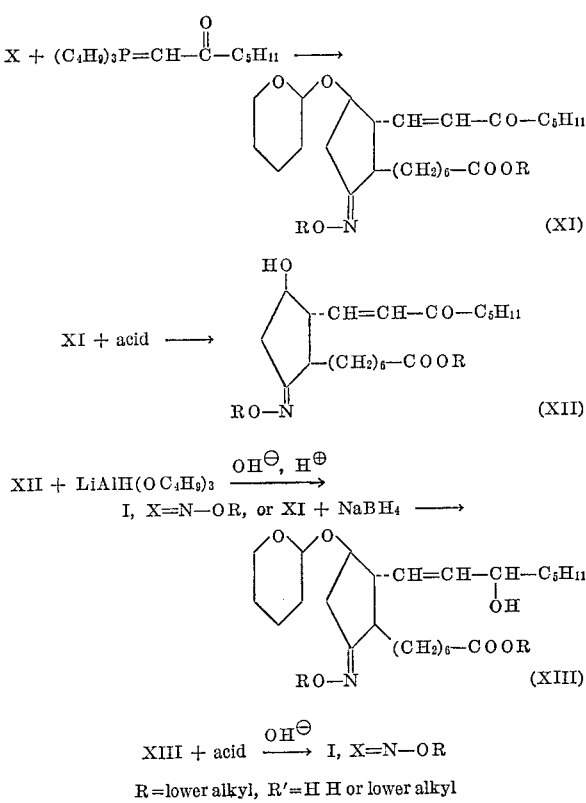

$R$=lower alkyl, $R'$=H H or lower alkyl

In the above reactions, any resulting ester may be hydrolyzed, for example, with the use of inorganic bases, such as aqueous solutions of alkali metal hydroxides, carbonates or bicarbonates, or trans-esterified, advantageously in the presence of small amounts of acids. The acids obtained may be esterified in the usual manner, for example, with alcohols in the presence of acids, with reactive esters or preferably diazo-compounds, or salified with any suitable base or ion exchanger. Any salt obtained may be converted into the free acid or another salt according to known methods.

Said reactions are carried out according to standard methods, in the presence or absence of diluents, preferably such as are inert to the reagents and are solvents thereof, as catalysts, condensing agents and/or inert atmospheres, at low temperatures, room temperature or elevated temperatures, at atmospheric or superatmospheric pressure.

The invention further includes any variant of the above process, in which an intermediate product obtainable at any stage thereof is used as starting material and any remaining steps are carried out, or the synthesis is discontinued at any stage thereof, or in which a starting material or intermediate respectively is formed under the reaction conditions, or in which a reaction component is used in the form of a salt or another reactive derivative.

Compounds of the invention and/or starting materials (for example special O-(2-haloakyl)-hydroxylamines, used in the preparation of the intermediates VI), that are mixtures of isomers, may be separated into single isomers by methods in themselves known. For example, compounds that contain one or more asymmetrical carbon atoms may be in the for of racemate mixtures, pure raceates, or optical antipodes. Mixtures of racemates can be resolved into pure racemates by virtue of the physiochemical differences between the components, for example, by chromatography and/or fractional crystallization. Racemic products can be resolved into optical antipodes, for example, by reaction with compounds containing no center of symmetry, separation of the diastereomeric products, such as salts or esters, and liberation of the optical active products.

The starting material used, i.e. compounds of Formula II, can be obtained according to the following formula scheme:

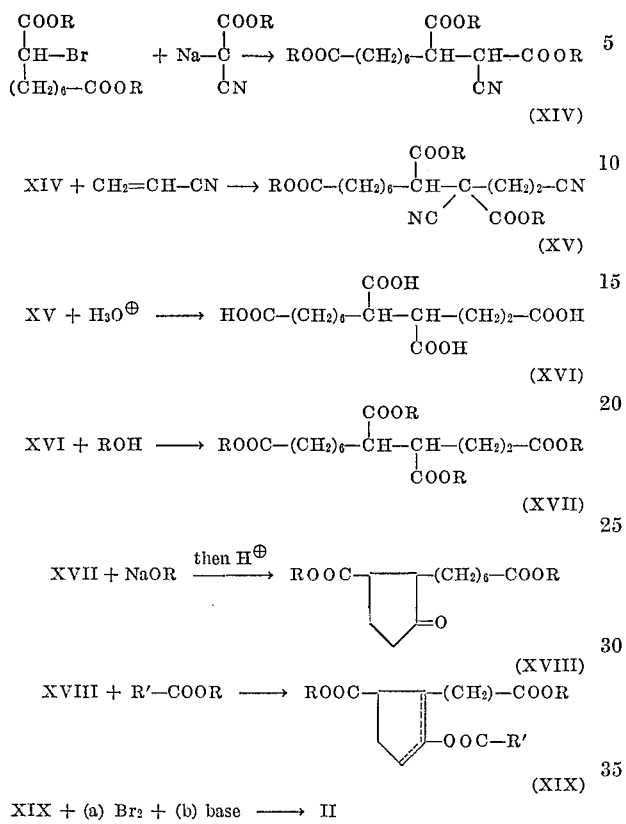

XIX + (a) Br$_2$ + (b) base ⟶ II

The following examples illustrate the invention, and are not to be construed as being limitations thereon. Temperatures are given in degrees centrigrade and the N.M.R. spectra are obtained from about 10% solutions in deuterochloroform at 60 M.c./s. with Si(CH$_3$)$_4$ as zero.

EXAMPLE 1

50 mg. of the faster moving isomer of ω-[2α-(3-hydroxy-1 - octenyl) - 3β - hydroxy - 5 - methoxyimino - cyclopentyl]-heptanoic acid are dissolved in 4 ml. levulinic acid and 1 ml. 13% aqueous perchloric acid are added while stirring and keeping the temperature at 6°. After two days the mixture is diluted with ice water, extracted with diethyl ether, the extract washed with water, dried, filered and evaporated. The residue is allowed to stand for 5 hours in a high vacuum and is then chromatographed on infusiorial earth and eluated with the upper phase obtained from the mixture consisting of: (a) 560 ml. methanol and 684 ml. water, (b) 60 ml. octanol and (c) 60 ml. chloroform, at room temperature (40 ml. of the lower phase thereof is used for impregnating the infusorial earth). The combined 5 ml. samples containing a slower moving fraction are evaporated to yield the racemic prostaglandin E$_1$ of the formula

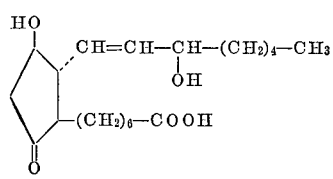

It shows the relative physical data and pharmocological activity as the optically active natural product, described in U.S. Pat. No. 3,069,322.

The faster moving fraction of the eluate yields the ω-[2α - (3 - hydroxy - 1 - octenyl) - 5 - oxo - 3 - cyclopentenyl]-heptanoic acid of the formula

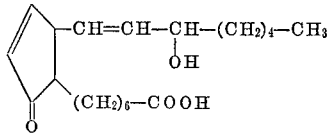

whose spectral data are identical with, and the pharmacological data correspond to those given for the optically active compound described in Biochem. Biophys. Res. Communications, 21,413 (1965).

The starting material is prepared as follows: 375 g. diethyl α-bromo-azelate are slowly added to the stirred solution of the sodium enolate, prepared from 28.5 g. sodium hydride and 131 g. ethyl cyanoacetate in 150 ml. glycol dimethyl ether. The mixture is refluxed overnight, then the solvent is removed under reduced pressure, the residue acidified with diluted hydrochloric acid, extracted with diethyl ether, the extract dried and evaporated. The residue is distilled and the fraction boiling at 190–205°/0.7 mm. Hg collected; it represents the triethyl α-cyano-β-carboxy-sebacate of the formula

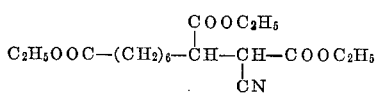

$\lambda_{max}$=2225 and 1735 cm.$^{-1}$.

0.2 g. sodium are reacted with 150 ml. dry ethanol and to the solution first 224 g. triethyl α-cyano-β-carboxy-sebacate and then 34.5 g. acrylonitrile are added slowly with stirring and the mixture is allowed to stand overnight at room temperature. It is then acidified with hydrochloric acid, evaporated in vacuo and the residue, containing the 1,3-dicyano-3,4,10-decanetricarboxylic acid triethyl ester of the formula

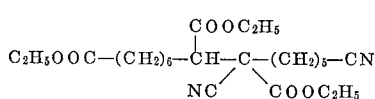

which is used without further purification; B.P. 181–183°/0.1 mm. Hg; $\lambda_{max}$=2250 and 1735 cm.$^{-1}$.

The whole amount thereof is refluxed in 1.4 liter concentrated hydrochloric acid for 24 hours, using an air condenser to permit the evaporation of the ethanol formed. The mixture is then evaporated, the residue triturated with diethyl ether and recrystallized from ethyl acetate to yield the 1,3,4,10-decane tetracarboxylic acid of the formula

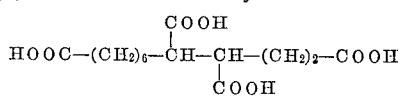

melting at 143–145°.

The mixture of 227 g. thereof, 1 liter ethanol-benzene (3:5) and 5 ml. concentrated sulfuric acid is refluxed on a water trap overnight. Hereupon the solution is concentrated, the residue taken up in diethyl ether, the extract washed with 10% aqueous potassium carbonate, dried and evaporated. The residue is distilled and the fraction boiling at 192/0.13 mm. Hg collected; it represents the 1,3,4,10-decanetetracarboxylic acid tetraethyl ester of the formula

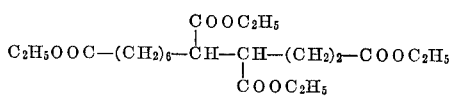

The solution of 225 g. thereof in 200 ml. dry diethyl ether is added slowly to a stirred mixture of 16 g. sodium hydride, 3 ml. ethanol and 200 ml. dry diethyl ether and the whole is stirred overnight at room temperature and for 2 additional days. Hereupon the mixture is acidified with diluted hydrochloric acid, washed with water, dried and evaporated. The residue is refluxed in diluted hydrochloric acid overnight. The mixture is then extracted with diethyl ether, the extract dried and evaporated. The residue is reesterified by refluxing it in 1 liter ethanol-benzene (3:5) and 5 ml. concentrated sulfuric acid with a water trap. The mixture is concentrated in vacuo, the residue taken up in diethyl ether, the extract washed with 10% aqueous potassium carbonate, dried and evaporated. The residue is distilled and the fraction boiling at 160–164°/0.1 mm. Hg collected; it represents the 2-(6-ethoxycarbonyl-hexyl) - 3 - oxo-cyclopentanecarboxylic acid ethyl ester of the formula

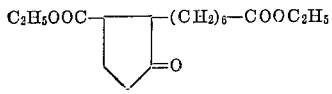

The semicarbazone thereof melts at 117°; I.R.-absorption:

$\nu_{max.}^{CHCl_3}=3515, 3380, 1735, 1690$ and $1560$ cm.$^{-1}$

The mixture of 95.5 g. thereof and 61.2 g. isopropenyl acetate is refluxed overnight in the presence of 1.0 g. p-toluene sulfonic acid. The cooled mixture is washed with 10% aqueous potassium bicarbonate, dried and evaporated. The residue is distilled and the fraction boiling at 168–175°/0.1 mm. Hg collected; it represents the corresponding enol acetate.

48 g. thereof are dissolved in 100 ml. dry carbon tetrachloride, the solution is cooled to −5° and 20.6 g. bromine in 100 ml. dry carbon tetrachloride are added dropwise during one hour while stirring, and stirring is continued for ½ hour after addition. Hereupon 13.2 g. triethylamine are added, the mixture is refluxed for 2 hours and allowed to stand at room temperature overnight. The precipitate formed is removed by filtration, the filtrate evaporated in vacuo, the residue distilled and the fraction boiling at 153–154°/0.1 mm. Hg collected; it represents the 2 - (6 - ethoxycarbonyl - hexyl)-3-oxo-1-cyclopentenecarboxylic acid ethyl ester of the formula

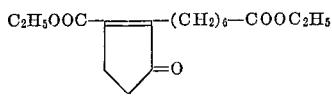

(The semicarbazone thereof melts at 87–88°; U.V.-absorption: $\lambda_{max}=298$ m$\mu$; I.R.-absorption:

$\nu_{max.}^{CHCl_3}=3510, 3370, 1720, 1690$ and $1560$ cm.$^{-1}$.)

2.27 g. thereof are dissolved in 25 ml. methanol and 25 ml. 10% aqueous potassium carbonate are added. The mixture is refluxed for 1½ hours, cooled and extracted with diethyl ether. The aqueous solution is cooled in an ice bath, acidified with concentrated hydrochloric acid and extracted with diethyl ether. The extract is dried, evaporated and the residue recrystallized from benzene to yield the 2-(6-carboxy-hexyl)-3-oxo-1-cyclopentene-carboxylic acid melting, after recrystallization from water, at 95–96°.

43.0 g. thereof are dissolved in the minimum amount of diethyl ether, and to the stirred solution ethereal diazomethane is added dropwise until the yellow color persists. The mixture is evaporated in vacuo, the residue distilled and the fraction boiling at 146°/0.1 mm. Hg collected; it represents the 2-(6-methoxycarbonyl-hexyl)-3-oxo-1-cyclopentene-carboxylic acid methyl ester.

The mixture of 14.7 g. thereof, 100 ml. carbon tetrachloride and 11.56 g. N-bromo-succinimide is refluxed for two hours while stirring. It is then filtered, the filtrate evaporated in vacuo and the residue dissolved in 50 ml. acetic acid. To the soltuion 13.0 g. silver acetate are added and the mixture is stirred and refluxed for one hour under nitrogen. It is poured into excess cold 10% aqueous sodium bicarbonate and the mixture is extracted with diethyl ether. The extract is dried, evaporated, the residue distilled and the fraction boiling at 169–170°/0.01 mm. Hg collected; it represents the 2-(6-methoxy-carbonyl-hexyl) - 3 - oxo - 5 - acetoxy-1-cyclopentene-carboxylic acid methyl ester of the formula

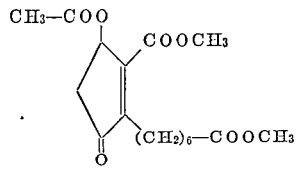

The solution of 10.1 g. thereof in 200 ml. 1.7 N-methanolic hydrochloric acid is allowed to stand at room temperature for 4 hours and then evaporated in vacuo. The residue is taken up in diethyl ether, the solution washed with water, dried, filtered and evaporated. The residue is chromatographed on 300 g. silica gel and eluted with ethyl acetate-methylene chloride (1:4) and (3:2). The latter eluate yields the desired 2-(6-methylcarbonyl-hexyl) - 3 - oxo - 5 - hydroxy-1-cyclopentene-carboxylic acid methyl ester, boiling at 156–158°/0.01 mm. Hg. (Its semicarbazone melts at 140–141° after recrystallization from aqueous methanol.)

3.0 g. thereof are dissolved in 100 ml. diethyl ether and 10 ml. trimethylsilyl chloride are added dropwise while stirring, followed by 15 ml. triethylamine. After stirring for ½ hour at room temperature, the mixture is filtered and the filtrate evaporated in vacuo. The residue is chromatographed on 250 g. silica gel and eluted with ethyl acetate-methylene chloride (1:9), to yield the 2-(6-methoxy-carbonyl-hexyl) - 3 - oxo - 5 - trimethylsiloxy-1-cyclopentene-carboxylic acid methyl ester of the formula

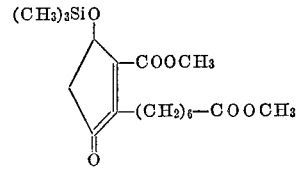

3.8 g. thereof are hydrogenated in 50 ml. methanol over 2 g. Raney nickel at 47 p.s.i. initial pressure at room temperature. After about 90 minutes the mixture is filtered and the filtrate evaporated in vacuo to yield the 2α-(6-methoxycarbonyl-hexyl) - 3 - oxo - 5α-trimethylsiloxy-cyclopentane-carboxylic acid methyl ester of the formula

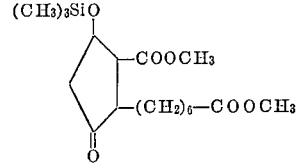

which shows in the U.V. spectrum only end-absorption; M.P. 22–24°.

The mixture of 3.5 g. thereof, 30 ml. pyridine and 8.0 g. O-methyl-hydroxylamine hydrochloride, is allowed to stand at room temperature for 24 hours. It is then evaporated in vacuo, the residue taken up in water, the mixture extracted with diethyl ether, the extract dried, filtered and concentrated. After cooling the 2α-(6-methoxycarbonyl-hexyl) - 3 - methoxyimino - 5α-hydroxycyclopentane-carboxylic acid methyl ester of the formula

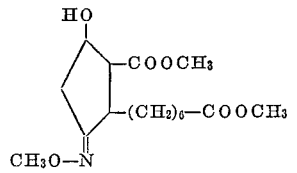

crystallizes and melts, after recrystallization from a large volume hexane, at 46–47°. It shows in the N.M.R. spectrum peaks at 159, 166, 219, 224 and 230 c.p.s., and exhibits hypotensive effects.

In the analogous manner the 2α-(6-methoxy-carbonyl-hexyl) -3 - hydroxyimino - 5α-hydroxy-cyclopentane-carboxylic acid methyl ester is obtained, melting at 97–98° after recrystallization from benzene-hexane.

15.8 g. of the methyloxime are dissolved in 450 ml. methanol and 450 ml. 10% aqueous potassium carbonate are added. The mixture is refluxed for 2 hours, cooled and extracted with diethyl ether. The aqueous layer is acidified with ice cold hydrochloric acid, saturated with ammonium sulfate and extracted with diethyl ether. The extract is dried, filtered and to the filtrate etheral diazomethane is added until the yellow color persists. After standing for 1½ hours at room temperature, the mixture is washed with 10% aqueous potassium bicarbonate, dried and evaporated to yield the 2β-(6-methoxycarbonyl-hexyl)-3-methoxyimino-5β-hydroxy-cyclopentane - carboxylic acid methyl ester of the formula

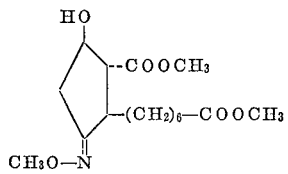

showing in the N.M.R. spectrum peaks at 229, 223 and 218 c.p.s. In the thin layer chromatogram (silica gel), eluted by ethyl acetate-chloroform 1:1, it travels faster than its above-described epimer.

The mixture of 3.05 g. thereof, 175 ml. methylene chloride, 1.3 g. dihydropyrane and 75 mg. picric acid is allowed to stand at room temperature for 24 hours. Hereupon it is evaporated in vacuo, the residue taken up in 40 ml. diethyl ether, the solution washed with 10% aqueous potassium bicarbonate and evaporated. The residue is chromagraphed on 100 g. silica gel and eluted with ethyl acetate-methylene chloride (1:19) and (1:9). The latter eluate yields the 2β-(6-methoxycarbonyl-hexyl)-3-methoxyimino-5β-(2-tetrahydropyranyloxy) - cyclopentanecarboxylic acid methyl ester, of the formula

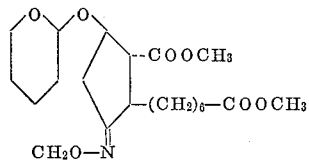

showing in the N.M.R. spectrum peaks at 277, 229, 223 and 219 c.p.s.

To the solution of 1.7 g. thereof in 25 ml. anhydrous ethanol, 3.4 g. sodium borohydride are added portionwide and the mixture is stirred at room temperature for 3½ hours. Hereupon ice and water are added, the mixture extracted with diethyl ether, the extract dried and evaporated. The residue is chromagraphed on 60 g. silica gel and eluted with ethyl acetate-methylene chloride (1:4) and (2:1). The latter eluate yields the ω-[2α-hydroxymethyl-3β-(2-tetrahydropyranyloxy) - 5 - methoxyimino-cyclopentyl]-heptanoic acid ethyl ester of the formula

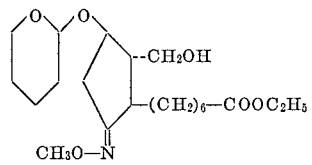

showing in the N.M.R. spectrum peaks at 280, 247 and 229 c.p.s.

To the stirred mixture of 0.5 g. thereof, 6 ml. dimethyl sulfoxide and 6 ml. benzene, the mixture of 0.15 ml. pyridine and 0.08 ml. trifluoroacetic acid is added, followed by 1.8 g. 1-cyclohexyl-3-(2-morpholino-ethyl)-carbodiimide metho-p-toluene sulfonate. The mixture is allowed to stand for 24 hours at 4° and is then shaken with diethyl ether and ice water. The organic layer is dried, filtered and evaporated to yield the 2β-(6-ethoxy-carbonyl-hexyl) - 3 - methoxyimino-5β-(2-tetrahydropyranyloxy)-cyclopentane-aldehyde of the formula

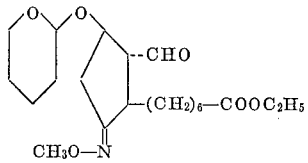

showing in the N.M.R. spectrum peaks at 536, 277, 247 and 229 c.p.s.

The solution of 0.4 g. thereof in 5 ml. diethyl ether is combined with the tri-n-butyl-phosphorane obtained from 350 mg. 1-chloro-2-heptanone and 410 mg. tri-n-butyl-phosphine in refluxing chloroform, treatment of the resulting phosphonium compound with 2 N-aqueous sodium hydroxide, distillation and collection of the fraction boiling at 144–146/0.02 mm. Hg. The mixture is allowed to stand at room temperature for 90 minutes, and then evaporated. The residue is chromatographed on 25 g. silica gel and eluted with ethyl acetate-methylene chloride (1:19), to yield the ω[2α-(3-oxo-1-octenyl)-3β-(2-tetrahydropyranyloxy) - 5 - methoxyimino - cyclopentyl]-heptanoic acid ethyl ester of the formula

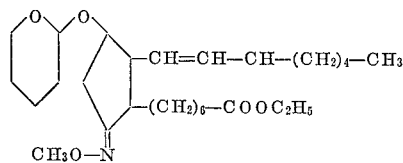

showing in the N.M.R.-spectrum peaks at 405, 372, 277, 247, 229 and 53 c.p.s.

The mixture of 0.29 g. thereof, 25 ml. methanol and 5 drops N-hydrochloric acid, is stirred at room temperature for 2½ hours and evaporated in vacuo. The residue is taken up in diethyl ether, the solution washed with water, dried, filtered and evaporated. The residue is chromatographed on 8 g. silica gel and eluted with ethyl acetate-methylene chloride (1:19) and (1:4). The latter eluate yields the ω-[2α-(3-oxo-1-octenyl)-3β-hydroxy-5-methoxyimino-cyclopentyl]heptanoic acid ethyl ester of the formula

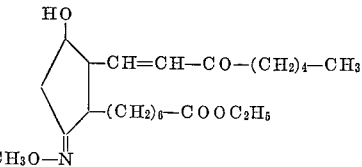

showing in the N.M.R. peaks at 405, 372, 247, 229 and 53 c.p.s. and in the U.V.-spectrum a $\lambda_{max.}=225$ m$\mu$ ($\epsilon=15,200$).

The corresponding free acid is obtained from 52 mg. thereof, 15 ml. methanol and 3 ml. 10% aqueous potassium carbonate while stirring overnight at room temperature. The mixture is then diluted with water, acidified with hydrochloric acid, saturated with ammonium sulfate and extracted with diethyl ether. The extract is dried, filtered and evaporated to yield said heptanoic acid derivative, which is recrystallized from pentane-diethyl ether while cooling in an ice salt bath; it melts at room temperature.

To the solution of 0.2 g. thereof in 20 ml. 1,2-dimethoxyethane, 0.4 g. lithium 3-tert. butoxy-aluminum hydride are added portionwise and the mixture stirred at room temperature for 4 hours. It is evaporated in vacuo below 35°, the residue taken up in 10 ml. water, the solution adjusted to a pH of 3–4 with cold N-hydrochloric acid and extracted with diethyl ether. The extract is dried, filtered, evaporated and the residue chromatographed on 40 g. infusorial earth and eluted with the upper phase obtained from the mixture of (a) the lower phase of 560 ml. methanol and 684 ml. water, (b) 60 ml. octanol and (c) 60 ml. chloroform, at room temperature. The combined 5 ml. samples containing the 2 major peaks are evaporated in vacuo, to yield 2 epimers of the ω-[2α-(3 - hydroxy - 1 - octenyl)-3β-hydroxy-5-methoxyimino-cyclopentyl]-heptanoic acid of the formula

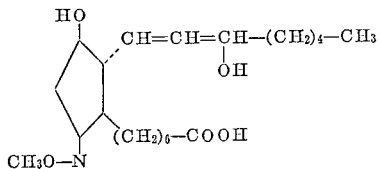

EXAMPLE 2

30 mg. of the ω - [2α - (3 - hydroxy-1-octenyl)-3β-hydroxy - 5 - methoxyimino - cyclopentyl]-heptanoic acid are dissolved in 1 ml. of a 9:1 mixture of freshly distilled levulinic acid and 13% aqueous perchloric acid, and the solution is stirred for 2 days at 4°. It is diluted with methylene chloride, the mixture washed with cold brine and evaporated. The residue is put onto a column, containing 5 g. silicic acid (Mallinckrodt material, screened through a sieve with 0.125 to 0.15 mm. openings, well washed with methanol, acetone and diethyl ether, dried and reactivated at 120° overnight) which is eluted first with 1% methanol in chloroform to yield as the first fraction the ω - [2α - (3 - hydroxy-1-heptenyl)-5-oxo - 3 - cyclopentenyl] - heptanoic acid, followed by a second fraction of levulinic acid, which was not removed by the previous washing procedure. With 2.5% methanol in chloroform, a trace of starting material is eluted and with 3.5% methanol in chloroform the desired racemic prostaglandin $E_1$ is eluted, showing in the N.M.R.-spectrum signals at 336 (triplett) and 243 c.p.s. (multiplett); it is identical with the product obtained according to Example 1.

The starting material is prepared as follows: 790 mg. of the ω - [2α - (3 - oxo-1-octenyl)-3β-(2-tetrahydropyranoloxy) - 5 - methoxyimino - cyclopentyl] - heptanoic acid ethyl ester are dissolved in 65 ml. 95% aqueous ethanol, 1.5 g. sodium borohydride are added, and the mixture is stirred under nitrogen for 75 minutes at room temperature. It is diluted with ice water, extracted with diethyl ether, the extract dried, filtered and evaporated. The residue is chromatographed on silica gel and eluted with ethyl acetate-methylene chloride (1:9) to yield the ω - [2α - (3 - hydroxy-1-octenyl)-3β-(2-tetrahydropyranoloxy) - 5 - methoxyimino - cyclopentyl]-heptanoic acid ethyl ester of the formula

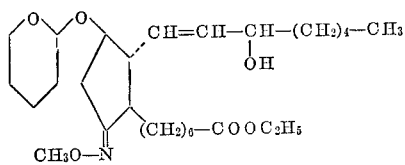

showing in the I.R.-spectrum (liquid film) a broad absorption band at 3,400 cm.$^{-1}$ (but no band in the U.V.-spectrum at 255 mμ).

410 mg. thereof are dissolved in 60 ml. methanol, 1 ml. N-hydrochloric acid is added and the mixture stirred at room temperature for 3½ hours. It is diluted with ice water, extracted with diethyl ether, the extracted dried, filtered and evaporated. The residue is subjected to preparative thin layer chromatography on alumina G.F. plates (1 mm. thick) and eluted with cyclohexane-dioxan-ethylacetate (7:2.5:0.5) to produce 3 bands of material. The fastest moving band can be detected by U.V. absorption and the slower moving bands by a phosphomolybdic acid spray. The slowest moving band is eluted with methanol and the eluate evaporated. 33 mg. of the residue obtained are dissolved in 10 ml. methanol, 5 ml. of 10% aqueous potassium carbonate are added and the mixture is refluxed for 1 hour. After cooling it is washed with diethyl ether, the aqueous layer acidified with 2 N hydrochloric acid and extracted with diethyl ether. The extract is dried, filtered and evaporated and the residue recrystallized from aqueous methanol, to yield the ω[2α-(3-hydroxy - 1 - octenyl) - 3β-hydroxy-5-methoxyimino-cyclopentyl]-heptanoic acid, melting at 97–99°; it is identical with that obtained according to Example 1 and shows in the I.R. and N.M.R.-spectra the same signals as the methyloxime of natural prostaglandin $E_1$. Both compounds also have the same mobility in thin layer chromatography on silica gel, when eluted with chloroform-methanol-acetic acid-water (90:6:1:0.7).

What is claimed is:
1. A compound of the formula

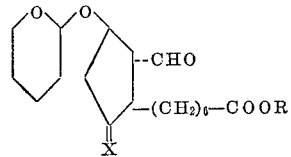

in which X is lower alkoxyimino, lower alkenyloxyimino, cycloalkoxyimino or cycloalkyl-alkoxyimino with 3 to 6 ring- and 1 to 4-chain-carbon atoms or halo-lower alkoxyimino and R stands for lower alkyl.

2. A compound as claimed in claim 1 and being a 2β - (6 - lower alkoxycarbonyl - hexyl) - 3 - lower alkoxyimino - 5β - (2 - tetrahydropyranyloxy) - cyclopentane-1α-carboxaldehyde.

3. A compound as claimed in claim 1 and being the 2β - (6 - ethoxycarbonyl - hexyl) - 3 - methoxyimino-5β - (2 - tetrahydropyranyloxy) - cyclopentane - 1α - carboxaldehyde.

No references cited.

NORMA S. MILESTONE, Primary Examiner

U.S. Cl. X.R.

260—340.3, 340.5, 448.2, 465.4, 468, 514